Jan. 10, 1928.

E. B. GIBSON

SPOT AND TURN LIGHT

Filed June 26, 1926

E.B.Gibson
Inventor,
By C.A.Snow&Co.
Attorneys.

Jan. 10, 1928.　　　　　　　　　　　　　　　1,655,900
E. B. GIBSON
SPOT AND TURN LIGHT
Filed June 26, 1926　　　　　　2 Sheets-Sheet 2

E. B. Gibson
Inventor,
By C. A. Snow & Co.
Attorneys.

Patented Jan. 10, 1928.

1,655,900

UNITED STATES PATENT OFFICE.

EZRA B. GIBSON, OF CADILLAC, MICHIGAN, ASSIGNOR OF ONE-HALF TO JOSHUA M. WARDELL AND ARISTA M. WARDELL, BOTH OF CADILLAC, MICHIGAN.

SPOT AND TURN LIGHT.

Application filed June 26, 1926. Serial No. 118,697.

This invention aims to provide a simple, compact, strong, and well-anchored lever mechanism for connecting a vehicle lamp with a steering mechanism.

In the drawings:—

Figures 1, 2:
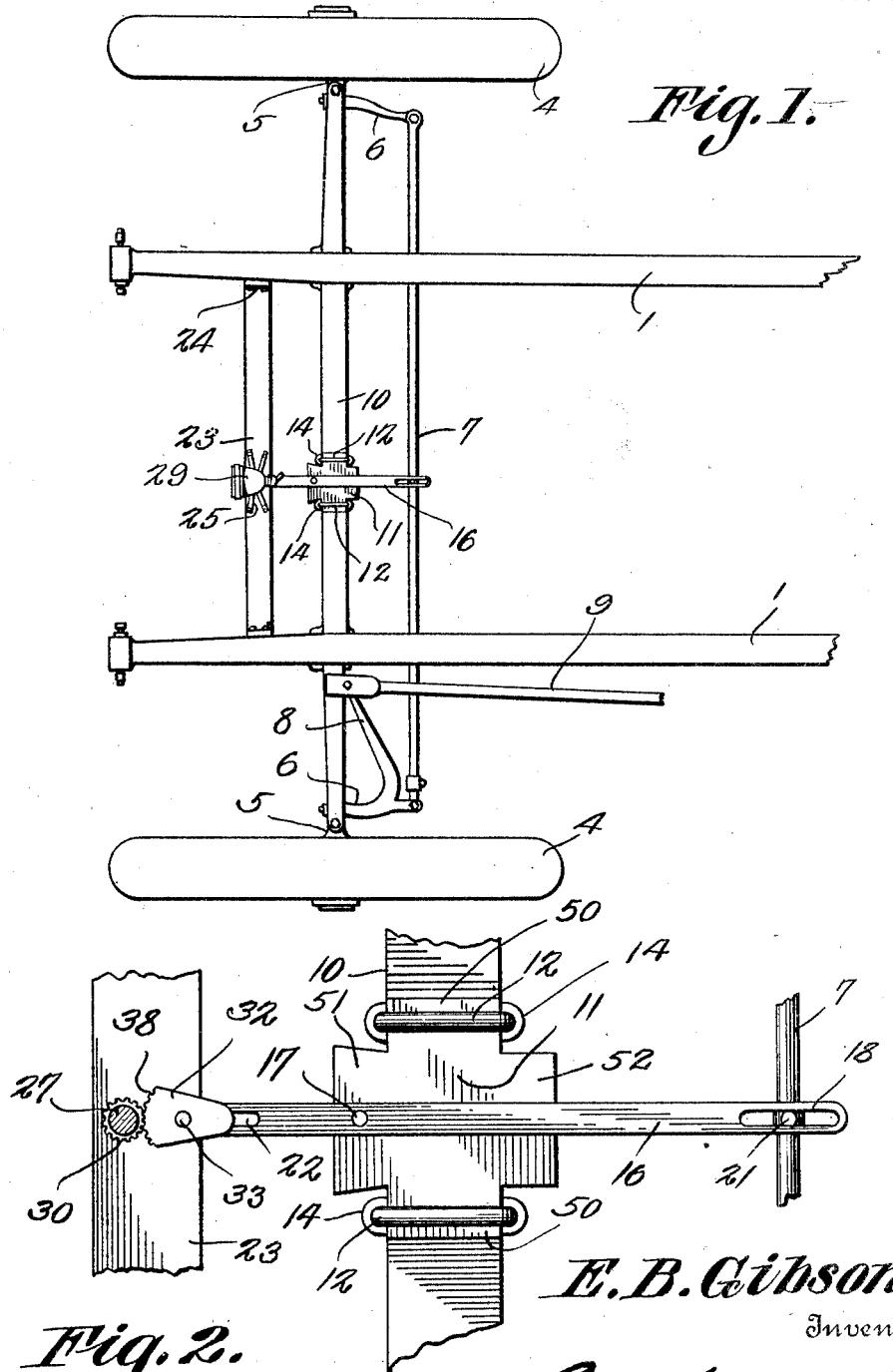
Figure 1 is a plan of the complete device.
Figure 2 is a plan of the lever and coacting parts.
Figure 3:
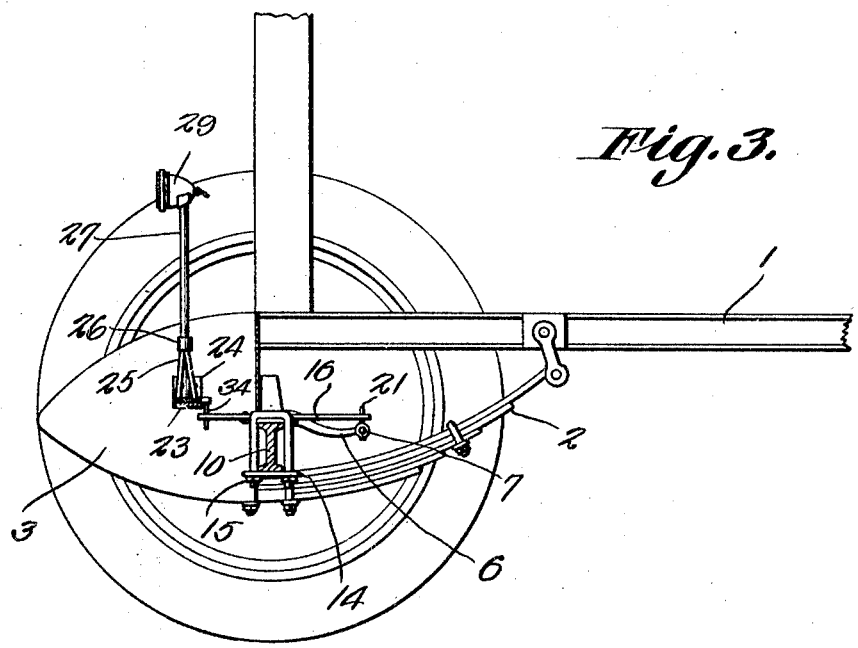
Figure 3 is a side elevation of the vehicle equipped with the device claimed.

The numeral 1 marks the chassis bars of an automobile, the front springs appearing at 2. The metal housings for the forward ends of the springs 2 are shown at 3. The wheels 4 are carried by the movable axle ends 5, and the axle ends 5 have rearwardly extended arms 6 pivoted to a drag link 7. One of the arms 6 has an extension 8 to which a rod 9 is connected, the rod 9 being operated by the steering wheel (not shown). The forward axle is designated by the numeral 10.

A cruciform anchor plate 11 is mounted on the axle 10. U-bolts 12 engage the lateral arms 50 of the anchor plate 11 and straddle the axle 10. The lower ends of the U-bolts 12 pass through yokes 14 held against the lower surface of the axle 10 by nuts 15 on the U-bolts. The mechanism above described obviously forms a means whereby the anchor plate 11 is held securely but adjustably on the axle 10. A lever 16 is slidably supported on the anchor plate 11. The lever 16 is fulcrumed intermediate its ends on a rivet 17 or the like, carried by the forward arm 51 of the cruciform anchor plate 11. There is an elongated slot 18 in the rear end of the lever 16. A split collar 19 is held by a clamp bolt 20 on the drag link 7. The collar 19 has an upstanding finger 21 received slidably in the slot 18 of the lever 16. In the forward end of the lever 16 there is an elongated slot 22.

Figure 4:
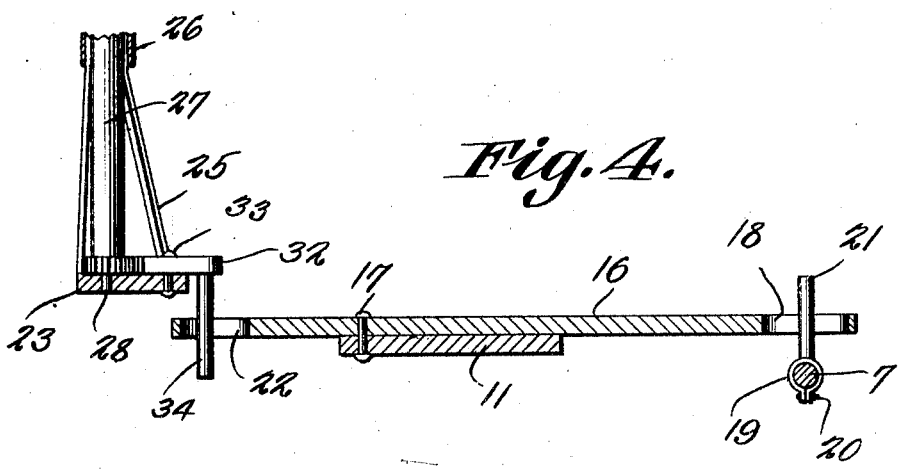
Figure 4 is a longitudinal section of the lever, the view showing sundry parts that are associated with the lever.

A support 23, in the form of a strip or bar, is provided, and is secured as at 24 to the spring housings 3. The support 23 may be located elsewhere on the vehicle, should occasion demand. A four-armed standard 25 is mounted on the support 23. There is a bearing 26 on the upper end of the standard 25. A vertical shaft 27 is journaled in the bearing 26. The shaft 27 has a reduced end 28 (Figure 4) that is journaled in the support 23. A lamp 29 of any desired sort is mounted on the upper end of the shaft 27. On the lower portion of the shaft 27 there is a gear wheel 30. The gear wheel 30 meshes with a segment 38 on the forward end of a second lever 32. The second lever 32 is fulcrumed intermediate its ends, at 33, on the support 23. The second lever 32 is supplied at its rear end with a depending projection 34 which is received slidably in the slot 22 in the forward end of the lever 16.

When the drag link 7 is moved endwise to effect a steering of the vehicle, the finger 21 on the drag link tilts the lever 16 on its fulcrum 17, and motion is imparted to the lever 32 by way of the depending projection 34 of the lever 32, the lever 32 tilting on its fulcrum 33, the segment 31 imparting rotation to the shaft 27 by way of the gear wheel 30, and the lamp 29 being turned laterally in accordance with the direction in which the vehicle is turned. The depending projection 34 on the second lever 32 permits the necessary vertical movement between the second lever 32 and the first lever 16, when the springs 2 yield.

The lateral arms 50 of the anchor plate 11 are of the same width as the axle 10, and, consequently, both the arms 50 and the axle 10 may be straddled by the U bolts 12, and the U bolts will afford an effective means for holding the anchor plate 11 securely in place on the axle. The fulcrum member 17 for the lever 16 is located on the forward arm 51 of the anchor plate, in advance of the axle 10. Both the fulcrum member 33 for the lever 32, and the lamp shaft 27, are mounted on the support 23 which is firmly connected with the vehicle at spaced points. There is small chance, therefore, that the gear 30 and the segment 38 will accidentally get out of mesh. The relative lengths of the levers 32 and 16 are such that the lateral swinging movement of the lever 16 will always be confined within the limits of the arms 52 and 51 of the anchor plate 11, and the lever 16, therefore, will not fail of an adequate support.

What is claimed is:—

In a device of the class described, a front vehicle axle, a support located in front of the axle, a drag link, a cruciform anchor plate on the axle and including lateral arms of the same width as the axle, a forward arm extended to the front of the axle, and a rear arm extended behind the axle; U bolts straddling the lateral arms and the axle, a first lever, a fulcrum element connecting the intermediate portion of the first lever with the forward arm of the anchor plate at a point in front of said axle, the rear arm of the axle plate supporting the lever at a point behind said axle, means for connecting the first lever at its rear end with the drag link, a lamp shaft mounted on the support to turn about a vertical axis, a gear secured to the lamp shaft, a second lever having its rear end overlapped on the forward end of the first lever, the second lever being fulcrumed intermediate its ends on the support, a segment on the forward end of the second lever and meshing with the gear, a pin and slot connection between the overlapped ends of the levers, and the relative lengths of the levers being such that the lateral sliding movement of the first lever will be confined within the limits of the forward and rear arms of the anchor plate.

In testimony that I claim the foregoing as my own, I have hereto affixed my signature.

EZRA B. GIBSON.